United States Patent [19]
Cho

[11] 4,279,939
[45] Jul. 21, 1981

[54] MILK REPLACER FOR BAKING CONTAINING ISOLATED VEGETABLE PROTEIN

[75] Inventor: Iue C. Cho, St. Louis, Mo.

[73] Assignee: Ralston Purina Company, St. Louis, Mo.

[21] Appl. No.: 110,718

[22] Filed: Jan. 9, 1980

[51] Int. Cl.³ .......................... A23C 21/04; A23J 3/00
[52] U.S. Cl. ................................. 426/583; 426/653; 426/656
[58] Field of Search .............. 426/583, 653, 656, 657

[56] References Cited

U.S. PATENT DOCUMENTS

| | | | |
|---|---|---|---|
| 2,555,514 | 6/1951 | Sharp et al. | 426/583 |
| 3,642,492 | 2/1972 | Arndt | 426/583 |
| 3,873,751 | 3/1975 | Arndt | 426/583 |
| 3,911,143 | 10/1975 | Colmey et al. | 426/583 |
| 3,943,264 | 3/1976 | Davis | 426/583 X |
| 3,966,992 | 6/1976 | Banks et al. | 426/583 |
| 4,105,803 | 8/1978 | Peng | 426/583 |

Primary Examiner—Robert A. Yoncoskie
Attorney, Agent, or Firm—Virgil B. Hill

[57] ABSTRACT

A non-fat milk replacer for baking containing an isolated vegetable protein ingredient is disclosed. The milk replacer is produced by forming a slurry containing 94–48% by weight dairy whey, 6–52% isolated vegetable protein, said slurry having a pH of 5.8–7.5 and an added alkaline earth cation concentration of 0.1 to 2.0% by weight of the solids. The slurry is heated within a critically defined temperature range of 190°–230° F. for a period of time sufficient to partially insolubilize the protein, followed by cooling and drying of the slurry to form a non-fat milk replacer which has comparable baking properties to non-fat dry milk.

13 Claims, No Drawings

MILK REPLACER FOR BAKING CONTAINING ISOLATED VEGETABLE PROTEIN

BACKGROUND OF THE INVENTION

The present invention relates generally to a non-fat dry milk replacer suitable for baking applications containing isolated soy protein. More particularly, the present invention relates to an improved, non-fat dry milk replacer containing isolated soy protein which is suitable as a non-fat dry milk substitute in a wide variety of leavened baked products, such as bread or cakes.

Generally speaking, there are two types of baked products, either leavened or unleavened products. Insofar as leavened baked products are concerned, these are typically divided into baked products which are either yeast leavened or chemically leavened. These two types of products differ from one another by the starting materials employed as well as the leavening action. In yeast type products leavening is caused by carbon dioxide produced as a result of yeast activity. In chemically leavened products the leavening action comes from the release of carbon dioxide caused by the reaction of a material such as sodium bicarbonate with an acid or acid type salt. Leavening is also not intended to occur prior to baking, but should occur primarily upon subjecting the batter or dough to oven heat.

In either the production of yeast leavened or chemically leavened products it is important to select the proper type of ingredients for making the baked goods. In this regard, the use of non-fat dried milk solids comprising mixtures of casein and whey has been well-known and utilized by the baking industry for many years. The non-fat dry milk solids have permitted the use of desired moisture levels to strengthen the structure of the dough or batter and thereby improve its handling characteristics. Products made with non-fat milk solids result in baked goods having desirable contour or appearance in addition to a uniform cell structure in the interior of the baked goods.

A variety of non-fat dry milk substitutes have been proposed by the prior art including mixtures of whey solids together with animal or vegetable protein. Such a product is described in U.S. Pat. No. 2,555,514 wherein a whey product is obtained that has properties making it useful as a substitute for milk in the manufacture of bread or similar baked goods. The noted process provides for the concentration of whey solids having a pH of 6.0-6.6 and a calcium content between 1.5 and 3% to provide a solids content between 25 and 55%. The whey is heated to a temperature of 200° to 280° F. and a protein material may also be added to the whey either before or after the heat treatment.

U.S. Pat. No. 3,873,751 describes the production of a similated milk product which is highly suitable as a non-fat dry milk substitute in baking applications, wherein the milk product is prepared by forming a mixture of sweet whey and vegetable protein; controlling the pH to between 5.8 to 7.5 following by heating of the mixture to a temperature between 220° to 400° F. The mixture is then subjected to a vapor flash treatment to remove objectionable flavors and odors. Following heating, pH adjustment can be carried out if desired or followed by drying of the product to obtain a powder having a moisture content of about 3% or so. This product may be used as a substitute for dried skim milk in producing baked goods. The product has excellent qualities as a substitute skim milk in bakery doughs, particularly bread and that if the noted product is used in bread dough, the baked bread has an aroma and toasting quality comparable to bread made with milk solids. The product also has greater water absorption properties to result in a more tender bread with a shorter fermentation time.

U.S. Pat. No. 3,943,264 provides a whey product which may be substituted for all or part of the milk solids used in the manufacture of baked goods. The composition set forth therein includes whey solids, a proteinaceous material which can comprise a material such as a soy isolate together with an added calcium source, an added phosphate source, and a stabilizing agent. The stabilizing agent can be selected from various natural or artificial phosphorous containing materials such as lecithin or other surface active agents. The dry product is highly suitable in chemically leavened baked products as a non-fat milk solids replacer and the resulting products have desired grain and texture.

In spite of the extensive use of non-fat dry milk substitutes containing vegetable protein, a continuing need exists for a non-fat dry milk replacer employing materials such as a vegetable protein isolate which is widely suitable for baking applications particularly in the preparation of leavened baked products. It is also necessary that such a replacer not only have the same desirable baking characteristics as non-fat dry milk solids, but that no characteristic flavor of the soy protein is carried through to the baked goods. Therefore, in the present invention a non-fat dry milk replacer has been obtained which is highly suitable in the production of leavened baked goods, especially chemically leavened baked goods wherein the resultant texture of these baked goods is considered to be as acceptable as those obtained using non-fat dry milk solids. It is, therefore, an object of the present invention to produce a non-fat dry milk replacer containing isolated soy protein which produces baked goods with comparable texture to those produced with non-fat dried milk.

SUMMARY OF THE INVENTION

The above object is achieved by the production of a non-fat dry milk replacer for baking which contains isolated soy protein produced by a method comprising; forming an aqueous suspension of an isolated vegetable protein ingredient and whey, said suspension having a solids content within the range of 3 to 50% by weight preferably 5 to 45% by weight, the isolated vegetable protein ingredient being present in an amount of from 6 to 52% by weight on a dry basis and the whey being present in an amount from about 94 to 48% by weight on a dry basis followed by controlling the pH to between about 5.8 to 7.5 in the presence of an edible alkaline earth cation, preferably by the addition of calcium hydroxide. The pH adjusted suspension is then heated to a critically defined temperature range of between about 190°-230° F. and retained at this temperature for a brief period of time, sufficient to partially insolubilize the protein followed by cooling of the suspension to form a non-fat milk replacer for baking purposes.

It has been determined that when an aqueous suspension containing an isolated vegetable protein ingredient and whey is heated to a temperature within the above range that an ingredient is obtained which is highly suitable as a non-fat milk replacer in baking applications. The above product provides a replacement for non-fat dried milk solids in various yeast or chemically leavened baked products with an acceptable protein level, although more importantly provides baked products which have the desirable texture, contour and uniform cell structure normally associated with baked goods made with non-fat dry milk. The noted process which employs a combination of a critically defined temperature range together with a certain sequence of pH adjustments, provides a non-fat dry milk replacer that can be employed in baking applications to produce baked products of equal texture to that obtained with non-fat dry milk. Details of the milk replacer of the present invention and process for its production are spelled out hereafter.

DESCRIPTION OF THE PREFERRED EMBODIMENTS

The concept of the present invention involves a special heat and pressure treatment of a mixture of whey and isolated vegetable protein within a critically defined temperature range, together with a series of pH adjustment steps to obtain a dry milk replacer that is highly suitable in baking applications. The isolated vegetable protein ingredient, which may be employed in the present invention, is preferably an isolated soy protein, but it is contemplated that other isolated proteins may also be employed in the present invention, such as isolates derived from other oil seeds including peanuts, sesame, sunflower, cotton seeds, and the like. Isolated soy protein, however, is the preferred ingredient for the non-fat dry milk replacer of the present invention.

The isolated vegetable protein ingredient employed in the present invention is described below relative to the production of a soy protein isolate since this is the major area of concern for which the present invention was developed. In this regard, an isolated vegetable protein ingredient is produced by the slurrying of defatted soy meal or flakes in an aqueous medium having a pH substantially above 7. Typically alkaline reagents such as sodium, potassium, calcium, or magnesium hydroxide or other commonly accepted food grade alkaline reagents are added to elevate the pH. The soybean flakes are then slurried for a period of time sufficient to put the protein into solution followed by the separation of insoluble material. The protein is precipitated from the solution at a pH near the isoelectric point of protein. Following precipitation, the precipitate is separated by centrifugation and washed with water to remove any occluded sugars. The precipitated protein can then be made into an aqueous suspension and employed in the present invention or further treated to remove undesirable flavors and/or odors as is described in U.S. Pat. No. 3,642,490 or alternatively the precipitated protein can be dried and used in the present invention. The present invention, therefore, is not intended to be limited by this specific type of isolated vegetable protein material that may be employed since a variety of processes exist for modifying the flavor or color of these products after isolation from the non-proteinaceous components of the protein source.

The dairy whey that is suitable for use in the present invention is obtained as a by-product from dairy operations such as the production of sweet dairy cheese. It is subjected to a heating operation prior to blending with the other materials. This type of treatment of dairy products such as whey, is well known and usually involves heating of the whey dispersed in an aqueous liquid at temperatures in the range of about 220°–260° F., for a sufficient period of time to concentrate the whey. The whey, as is employed in the present invention, is treated in the above fashion prior to mixing with the isolated vegetable protein ingredient pursuant to the process of the present invention. The concentrated whey is discharged from an evaporator or a similar apparatus followed by formation into a slurry. Alternatively, the whey product can be dried after concentration and then reslurried and the present invention is not intended to be limited by the specific form of either the whey or the isolated vegetable protein ingredient. The isolated vegetable protein ingredient, such as the isolated soy protein can be added directly to the concentrated whey as it is removed from the evaporator, although if the whey has been previously dried and is in a powdered form or the isolated protein is in dried form, then the mixture of isolated vegetable protein material and whey is preferably heated to about 130°–140° F. to assure complete dispersal of the whey and isolate in the water.

The combination of whey and isolated vegetable protein ingredient should be controlled so that the aqueous suspension formed from the combination of these two ingredients will have a level of whey on a dry basis of between about 94 to 48% by weight preferably 84–75% by weight, and an isolated vegetable protein material on a dry basis of between about 6 to 52% by weight, preferably 11–25% by weight.

The whey and isolated protein are combined into an aqueous slurry or suspension having a solids content of between about 3 to 50% by weight and preferably between about 5 and 45% by weight. The slurry is adjusted to a pH of between about 5.8 to 7.2 and preferably to a pH between about 6.2 to 7.0.

It is important to include a certain percentage of edible alkaline earth cation, preferably calcium ion in the slurry prior to heat treatment. Typically, the added calcium level will be between 0.1 and 2.0% by weight of the solids, and preferably between 0.2 and 1.0% by weight of the solids. While the desired level of calcium can be achieved by the addition of various calcium compounds, a preferred way is to use calcium hydroxide to also adjust the pH of the slurry to within the desired range. Alternatively, other types of alkali can be used to adjust the pH, with the required level of alkaline earth cation, being added in the form of salts or other compounds, which ionize in the aqueous medium. The presence of an alkaline earth cation assists in providing desirable textured properties in baked goods.

While not wishing to be limited by a particular theory, with regard to the present invention, it is believed that most vegetable protein isolates hydrate and hold water extremely well. The strong bond which exists between the protein and water is desirable in many food applications, however, it is believed that this bond between the protein and water prevents uniform volatilization of the moisture during baking if the protein is used in a dough. This poor volatilization of the water results in baked goods with gooey textures, poor expansion or very uneven cell structure. By contrast, the alkaline earth cation together with the heat treatment at the desired pH partially insolubilizes the protein molecule to permit only loose bonding between the water and protein and provide uniform vaporization of the moisture during baking. The partial solubility of the protein molecule still enables the protein to retain its desirable mixing characteristics with water thereby permitting easy mixing of the dough.

Following formation of the slurry, it is also desirable, but not required, to homogenize or subject the suspension to a sufficient agitation such that complete dispersal of the isolated vegetable protein ingredient and the whey takes place prior to the heating step.

The aqueous suspension having a controlled solids content, is then subjected to heating in order to elevate the temperature of a slurry or suspension to within a critically defined temperature range of between about 190° to 230° F., preferably between about 200° to 215° F. The suspension is maintained at this temperature for a period of time, whereby partial insolubilization of the protein by the presence of the alkaline earth cation and the application of heat occurs thereby resulting in a combined protein and whey mixture which is highly suitable for baking applications.

Heating may be carried out in a variety of devices, including either direct or indirect heating means. Direct heating typically refers to the injection of steam directly into the slurry to elevate the temperature whereas indirect heating refers to a device having heat transfer between the steam and slurry but without direct contact. The amount of time that the slurry is heated for the noted temperature range is typically between about 5–60 seconds. Currently, a satisfactory and convenient way of achieving heating of the slurry to within the noted critical temperature range is to pass the suspension at a high velocity through a direct heating device which is commonly known as a jet cooker. Such an apparatus includes adjacent jet nozzle orifices, normally concentric, through which the suspension and pressurized steam are ejected at high velocities in intersecting flow patterns. Alternatively, a spirotherm heater provides an indirect means of heating the slurry without the mechanical working during the heating, after which the slurry is retained for the noted period of time.

The time interval of the suspension in the nozzle of a jet cooking apparatus, as generally described above, is estimated to be only about one second or less. The nozzle orifice for the slurry is small being only a fraction of an inch so that the suspension solids are subjected to severe dynamic or physical working from interaction with the steam during ejection of the suspension into a retention chamber.

The suspension as heated in the Jet Cooker, is ejected through the nozzle into a special retention or holding chamber wherein the slurry is at a temperature between about 190° to 230° F. with said chamber maintaining the temperature of the suspension for a period of time of between about 5 to 60 seconds and preferably 7 to 15 seconds. Following retention of the suspension in the holding chamber for the noted period of time and depending on the temperature used, pressure on the suspension can be released by discharging the suspension into a reduced pressure zone or suitable receiving means that is normally at or near atmospheric pressure or below. This discharge and sudden pressure release causes rapid flash off of a portion of the moisture of the suspension in addition to substantial cooling of the remaining suspension because of the heat of vaporization absorbed from the suspension.

The slurry can be cooled by the pressure release, or alternatively can be cooled without a change in pressure by passing through a heat exchanger to a temperature which is at least about 140° F. but usually not above 165° F. in order to prevent bacterial propagation in said slurry. This purified heated suspension is then adjusted to a pH value between about 5.8 to 7.5 and preferably 6.2 to 7.0. This pH adjustment is achieved by adding a food grade alkaline reagent such as sodium, calcium, magnesium, potassium, hydroxide or other common food grade neutralizing agents and the like or a mixture of any of these will also serve the same purpose. Following neutralization of the slurry, the slurry or suspension is then dried preferably by a flash drying process, such as spray drying to obtain a powder having a moisture content of about 3% or less.

This product may be used as a substitute for dry skim milk in producing yeast or chemically leavened baked goods to provide the baked products with an attractive appearance such as is obtained by the use of dry skim milk. It possesses no noticeable odor or flavor characteristics of soy and functions in baking applications on a comparable basis with dried skim milk. The texture of leavened baked goods produced with the non-fat dry milk replacer of the present invention is considered to be highly desirable with the baked products having unusually good symmetry, volume, and cell structure. To insure a complete understanding of the present invention, the following illustrative examples are set forth.

EXAMPLE 1

501 lbs. of dried dairy whey having a solids level of 95% by weight and 137 lbs. of dried isolated soy protein also with a solids level of 95% by weight were added to 1,134 lbs. of water which had been preheated to 130° F. The slurry had a solids content of 36.0% by weight. The slurry was agitated while the pH was adjusted to 6.4 using a 20% slurry of calcium hydroxide. The added calcium content of the slurry was estimated to be about 0.35% by weight of the solids. The slurry was homogenized at 2,500 psi and divided into five separate batches. Each of the batches which were identified with the numbers 1–5, were then heated with a jet cooker to different temperatures and were held at these different temperatures for 7 seconds. The temperatures used were: Batch #1 170° F., #2 190° F., #3 210° F., #4 230° F., and #5 270° F.

Each batch was then discharged into a vacuum chamber which was at a negative pressure equivalent to 20 inches of mercury during which the slurry was cooled to a temperature of 150° F. The pH of each batch was adjusted to 6.8 with 50% solution of sodium hydroxide. The slurry in each batch was homogenized at 2,500 psi and spray dried at an exhaust temperature of 220° F.

The spray dried skim milk replacers from each of the five batches were evaluated in the production of layer cakes in accordance with the following formulation and baking procedure. The batter formulation is as follows:

| Ingredients | % by Weight | Weight (gms/Batch) |
| --- | --- | --- |
| Cake Mix | 54.3 | 521.1 |
| Liquid Egg Whites | 10.3 | 99.0 |
| Experimental Products | 2.0 | 18.9 |
| Water (70° F.) | 33.4 | 320.0 |

All of the above ingredients including water at 70° F., were placed in a 3 quart mixing bowl and mixed with a Hamilton Beach Mixer Model #C-100 for one minute at the No. 2 speed. After this the mixing was continued for an additional two minutes at the No. 7 speed. The batters formed from each of the five batches of dried milk replacers and made pursuant to the above formula were measured for any temperature increase since the batter temperature should not have appreciably increased over the temperature of the water used for the batter. The specific gravity of each of the batters was also measured, generally by the procedure set forth in *American Association of Cereal Chemists* Method 72-10. Viscosity of each of the batters was measured by filling a 180 ml beaker with batter, and reading after 15 seconds on a Brookfield Model RVT, Viscometer using Spindle #6 at 10 rpm. After the above test on each of the batters was performed, each batch of batter was used to make 2-3 layer cakes according to the following procedure. 445 gms of cake batter was placed in a 9 inch greased round cake pan and baked at 350° F. for 33 minutes in an oven. The cakes were then cooled for 20 minutes and the volume (cc) and weight of each of the cakes was measured. An average figure for the volume and weight was calculated. After a period of 2 hours, each of the cooled cakes was evaluated for texture. The textural examination consisted of a visual examination of the surface of the cake for a desirable, rounded contour without visible dips or depressions on the surface of the cake. Each of the cakes was also broken in half to generally evaluate whether or not the cake had any significant horizontal cracking, since a significant amount of cracking would be undesirable.

Tenderness of the cake was measured by placing two cake pans, 8 inches in diameter by 2 inches high, upside down on a flat surface and about 6 inches apart. A cake would then be suspended between the plates. The time it took for the cake to break was believed to correlate with the tenderness of the cake, in other words whether it was firm or would readily crumble. All of the above test results on the batters and cakes made with each of the five batches of dried milk replacers are set forth in Table 1. A control batter, made with non-fat dry milk, was used for comparative purposes.

EXAMPLE 2

230 lbs. of dried dairy whey having a solids level of 95% by weight and 64 lbs. of dried isolated soy protein, also with a solids level of 95% by weight were added to 505 lbs. of water which had been preheated to 130° F. The slurry had a solids content of 36.8% by weight. The slurry was agitated while the pH was adjusted to 6.4 with a 20% slurry of calcium hydroxide. The added calcium content of the slurry was estimated to be about 0.92% by weight of the solids.

The slurry was homogenized at 2,500 psi and divided into three separate batches. Each of the batches which were identified with the numbers 1-3, were then heated in an indirect heat exchanger to different temperatures and held at these temperatures for 5 seconds. The temperatures used were Batch #1-180° F., #2-210° F., #3-240° F.

Each batch was then discharged into a heat exchanger where it was cooled to 140° F. The pH of each batch was adjusted to 6.8 with a 50% solution of sodium hydroxide. The slurry from each batch was homogenized at 2,500 psi and spray dried at an exhaust temperature of 220° F. The spray dried skim milk replacer from each of the three batches were evaluated in the production of layer cakes in accordance with the following formulation and baking procedure.

The formulation for the dry cake mix is as follows:

| Ingredient | % by weight |
| --- | --- |
| Cake Flour | 39.54% |
| Shortening | 11.07% |
| Sugar | 43.56% |
| Salt | 2.35% |
| Baking Powder | 1.96% |
| Dry Egg White | 1.56% |

TABLE 1

Batter and Cake evaluations made with 5 batches of non-fat dried milk replacer heated to different temperatures.

| Sample | Temperature of Heating (°F.) | Specific Gravity Batter | Viscosity Batter CPS | Batter Temp. °F. | Avg. Cake Weight (G) | Avg. Cake Volume (cc) | Visual Exam Dips | Visual Exam Horizontal Cracking | Tenderness (sec.) |
| --- | --- | --- | --- | --- | --- | --- | --- | --- | --- |
| 1 | 170 | 0.707 | 14,200 | 72 | 409 | 960 | NONE | Moderate | 13.4 (Moderate) |
| 2 | 190 | 0.707 | 14,000 | 72 | 411.5 | 930 | NONE | Moderate | 15.1 (Slight) |
| 3 | 210 | 0.775 | 11,000 | 72 | 407 | 1047.5 | NONE | None | 20.8 (Firm) |
| 4 | 230 | 0.707 | 14,200 | 72 | 411.5 | 1015 | NONE | Severe | 38.0 (Slight) |
| 5 | 270 | 0.711 | 13,050 | 72 | 410.0 | 975 | NONE | Moderate | (Slight) |
| 6 | Control | 0.806 | 800 | 72 | 345.5 | 925 | NONE | None | 33.8 (Firm) |

It may be seen from the above data that cakes produced from milk replacers which were heated to within the critically defined temperature range had the highest volume, the lowest weight and the best visual characteristics. These cakes compared favorably to the control which was prepared with conventional non-fat dry milk. It may be seen that the temperature of heating is an important step in the production of a dried non-fat milk replacer which has comparable backing properties to non-fat dry milk.

DRY CAKE MIX PREPARATION PROCEDURE

The sugar and shortening were blended for 3 minutes. The rest of the ingredients were added and mixed for 5 minutes. The material was sieved and mixed again for 3 minutes. This cake mix was used to prepare the cake batter having the following formula:

| Ingredient | % by weight |
| --- | --- |
| Dry Cake Mix | 62.17% |
| Experimental Milk Replacers | 1.22% |

-continued

| Ingredient | % by weight |
|---|---|
| Water (72° F.) | 36.61% |

The dry cake mix and each of the three experimental batches of milk replacer were blended for one minute. A non-fat dry milk was used as a control sample. One half of the necessary water was added and mixed for 1 minute. The side of the mixing bowl was scraped and the rest of the water was added slowly over one minute with mixing. The side of the mixing bowl was scraped and the batter mixed for two additional minutes. The specific gravity temperature and viscosity were measured according to the procedure described in Example 1.

Following measurements on the batter, a 390 gm portion was placed in an 8 inch greased baking pan and baked for 21 minutes at 380° F. The cakes were cooled for 3 minutes, taken out of the pan and stored over night at room temperature. The following day the average weight, volume, and visual examination for appearance as set forth in Example 1 were measured, with the exception that the horizontal cracking test was omitted. These results are set forth in Table 2 below.

TABLE 2

Batter and Cake evaluations made with 3 samples of milk replacer heated to different temperatures.

| Sample | Temperature of Heating, °F. | Specific Gravity Batter | Viscosity Batter CPS | Batter Temp. °F. | Avg. Cake Weight (G) | Avg. Cake Volume (CC) | Visual Exam Dips | Tenderness |
|---|---|---|---|---|---|---|---|---|
| 1 | 180 | 0.814 | 16,500 | 71 | 352 | 1037 | Flat | Slight |
| 2 | 210 | 0.814 | 16,000 | 71 | 347 | 1025 | None | Firm |
| 3 | 240 | 0.806 | 15,000 | 71 | 349 | 1012 | Slight | Severe |
| Control (NFDM) | — | 0.814 | 1,450 | 71 | 344 | 1000 | None | Firm |

It may be seen from the above data that the best results were obtained with the non-fat milk replacer made at a temperature within the range set forth in the present invention. The characteristics of the cakes made with this milk replacer were comparable to the characteristics of cakes made with non-fat dry milk.

EXAMPLE 3

614 lbs. of dried isolated soy protein having a moisture content less than 5.0% was added to 7,230 lbs. of dairy whey having a solids level of 37.7% by weight. The slurry was agitated while the temperature was elevated to 130° F. The pH of the slurry or suspension was adjusted to 6.4 using a 20% slurry of calcium hydroxide. The added calcium content of the slurry was estimated to be about 0.3–0.33% by weight of the solids.

The slurry was homogenized at 2,500 psi and passed through a jet cooker wherein it was heated to a temperature of 210° F. and held at that temperature for 12 seconds. The slurry was then cooled in a heat exchanger to 145° F. Following cooling, the slurry was adjusted to a pH of 6.8 with a 50% solution of sodium hydroxide and homogenized at 2,500 psi. The slurry was then spray dried at an exhaust temperature of 200° F. to a moisture level of about 3% by weight.

Two samples of the above dried milk replacer were evaluated for baking performance against a control of non-fat dry milk by the procedure set forth in Example 1 and the results are set forth below in Table 3.

TABLE 3

Batter and cake evaluations.

| Sample | Specific Gravity Batter | Viscosity Batter (CPS) | Batter Temp. (°F.) | Avg. Cake Weight (G) | Avg. Cake Volume (CC) | Visual Example Dips | Tenderness | Horiz. Cracking |
|---|---|---|---|---|---|---|---|---|
| 1 | .735 | 12,800 | 72 | 417.5 | 1060 | None | Firm | None |
| 2 | .703 | 13,650 | 72 | 412.5 | 1190 | None | Firm | None |
| Control | .727 | 12,400 | 72 | 414.5 | 1177.5 | None | Slight | None |

It may be seen that based on the evaluation procedure used, the non-fat dried replacer worked at least as well as the non-fat dry milk both, in ease of batter formation as well as baking characteristics.

Two samples of the above dried milk replacer were also evaluated for baking performance against a control of non-fat dried milk by the procedure set forth in Example 2 and these results are set forth below in Table 4.

TABLE 4

Batter and cake evaluations.

| Sample | Specific Gravity Batter | Viscosity Batter (CPS) | Batter Temp. °F. | Avg. Cake Weight (g) | Avg. Cake Volume (cc) | Visual Exam Dips | Tenderness | Horiz. Cracking |
|---|---|---|---|---|---|---|---|---|
| 1 | .707 | 3600 | 72 | 346.5 | 1000 | Slight | Firm | None |
| 2 | .692 | 4150 | 72 | 351.5 | 1025 | Slight | Firm | None |
| Control | .719 | 3300 | 72 | 345 | 975 | None | Firm | None |

Based on the evaluation procedure and formulation used, the non-fat dried milk replacer worked at least as well as the non-fat dry milk, both in ease of batter formation as well as baking characteristics.

EXAMPLE 4

To illustrate the importance of including an alkaline earth cation in the slurry during heat treatment, 250 lbs. of dried dairy whey having a solids level of 95% by weight and 68 lbs. of dried isolated soy protein, also with a solids level of 95% were added to 567 lbs. of water which had been preheated to 130° F. The slurry had a solids content of 34.1% by weight. The slurry was agitated while the pH was adjusted to 6.4 using a 50% solution of sodium hydroxide.

The slurry was homogenized at 2,500 psi and heated in a Spirotherm heater to a slurry temperature of 200° F. The slurry was then discharged into a vacuum chamber which was at a negative pressure equivalent to 20 inches of Mercury during which the slurry was cooled to a temperature of 150° F. The pH of the slurry was then adjusted to a pH of 6.8 with a 50% solution of sodium hydroxide. The slurry was homogenized at 2,500 psi and spray dried at an exhaust temperature of 220° F.

The dried product has a protein content of 29.6% and a moisture content of 9.16%.

EXAMPLE 5

To illustrate the importance of including an alkaline earth cation in the slurry during heat treatment, 250 lbs. of dried dairy whey having a solids level of 95% by weight and 68 lbs. of dried isolated soy protein also with a solids level of 95% by weight were added to 567 lbs. of water which had been preheated to 130° F. The slurry had a solids content of 34.1% by weight. The slurry was processed in an identical manner to that in Example 4 except that calcium hydroxide was used to adjust the pH to 6.4 prior to heating. This resulted in an added calcium level in the slurry of 0.87% by weight. The product had a protein content of 29.9% by weight and a moisture content of 10.30%.

EXAMPLE 6

Two samples of each of the products produced in Examples 4 and 5 were evaluated for ease of batter formation as well as baking characteristics using the formulations and procedures set forth in Example 2, except that no evaluation was made for horizontal cracking. These products were produced in essentially the same way with the exception that one employed a calcium hydroxide addition before heating whereas the other employed sodium hydroxide. These results are set forth below in Table 5.

was added were better than was obtained with the sodium hydroxide.

In the light of the criteria set forth herein, this invention is intended to be limited only by the scope of the appended claims and reasonable equivalents thereof.

What is claimed is:

1. A method of preparing a milk replacer containing an isolated vegetable protein for baking comprising:
   (a) forming a suspension of an isolated vegetable protein material and dairy whey, said suspension having a solids level of between 3–50% by weight, said isolated vegetable protein material being present on a dry basis in an amount of 6–52% by weight and said dairy whey being present on a dry basis in an amount of 94–48% by weight;
   (b) controlling the pH of the suspension to between about 5.8 to 7.5, said suspension having an added alkaline earth cation level of between 0.1 and 2.0% by weight of the solids;
   (c) heating the suspension to a temperature of between about 190°–230° F. for between about 5–60 seconds; and
   (d) cooling said suspension to form a milk replacer product suitable for baking.

2. The method of claim 1 wherein said isolated vegetable protein material is a soy isolate.

3. The method of claim 1 wherein said suspension has a solids level of 5–45% by weight.

4. The method of claim 1 wherein the pH of the suspension is between about 6.2 and 7.0.

5. The method of claim 1 wherein the suspension is heated to a temperature of between about 205°–215° F.

6. The method of claim 1 including the step of drying the product to a powder.

7. The method of claim 1 wherein the added alkaline earth cation is calcium.

8. The method of claim 1 wherein the said suspension is cooled to a temperature of between about 140°–165° F.

9. The method of claim 1 wherein the isolated vegetable material is present on a dry basis in an amount of 11–25% by weight.

10. The method of claim 1 wherein the dairy whey is present on a dry basis in an amount of between 84–75% by weight.

11. The method of claim 1 including the step of adjusting the pH of the suspension to between about 5.8 and 7.5 following the cooling step.

12. The method of claim 1 wherein the added calcium

TABLE 5

| | | Batter and cake evaluations with and without alkaline earth cation addition before heating. | | | | | | |
|---|---|---|---|---|---|---|---|---|
| Run | Sample | Specific Gravity Batter | Batter Temp. | Batter Viscosity (CPS) | Avg. Cake Weight | Avg. Cake Volume | Visual Exam Dips | Tenderness |
| 1 | No Ca++ addition | .786 | 72 | 2250 | 354 | 1012 | Slight | Moderate |
|   | Ca++ addition | .786 | 72 | 2250 | 354 | 1013 | Flat | Firm |
| 2 | No Ca++ addition | .802 | 72 | 2250 | 252 | 1000 | Moderate | Severe |
|   | Ca++ addition | .814 | 72 | 2000 | 349 | 1025 | OK | Firm |

It may be seen from the above data that while the batter characteristics, cake weight, and volume were substantially the same, either with or without the addition of alkaline earth cation to the slurry prior to heating, the subjective textural characteristics of the cake made with the milk replacer to which the calcium ion level is between about 0.2 and 1.0% by weight of the solids.

13. The method of claim 1 wherein the suspension is heated for between about 7–15 seconds.

* * * * *